United States Patent
Lee et al.

(10) Patent No.: US 8,548,384 B2
(45) Date of Patent: Oct. 1, 2013

(54) ADAPTIVE INTERFERENCE ALIGNMENT PRECODING AND DECODING TO PREVENT MULTI-CELL INTERFERENCE

(75) Inventors: Nam-Yoon Lee, Daejeon-si (KR); Young-Doo Kim, Seoul (KR); Do Hyung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1003 days.

(21) Appl. No.: 12/610,477

(22) Filed: Nov. 2, 2009

(65) Prior Publication Data
US 2010/0248712 A1    Sep. 30, 2010

(30) Foreign Application Priority Data
Mar. 25, 2009    (KR) .................. 10-2009-0025199

(51) Int. Cl.
*H04B 1/00*    (2006.01)
*H04B 15/00*    (2006.01)
*H04B 7/00*    (2006.01)

(52) U.S. Cl.
USPC ........................................ 455/63.1; 455/500

(58) Field of Classification Search
USPC ............. 455/63.1, 562.1, 524, 500, 103, 132, 455/114.2, 278.1, 296
See application file for complete search history.

(56) References Cited

U.S. PATENT DOCUMENTS

| 7,885,689 B2 * | 2/2011 | Venkatesan ................ 455/562.1 |
| 2008/0274760 A1 * | 11/2008 | Senarath et al. .............. 455/512 |

FOREIGN PATENT DOCUMENTS

| JP | 2005-027107 | 1/2005 |
| KR | 10-0682075 B1 | 2/2007 |
| KR | 10-0800116 B1 | 1/2008 |
| KR | 1020080041594 | 5/2008 |
| KR | 1020080110536 | 12/2008 |

* cited by examiner

*Primary Examiner* — Eugene Yun
(74) *Attorney, Agent, or Firm* — NSIP Law

(57) ABSTRACT

A mobile station and a network control apparatus are provided. The network control apparatus may generate beamforming information, associated with an interference alignment of a plurality of mobile stations, and transmit the beamforming information to a plurality of base stations. The mobile station may receive a signal from the plurality of base stations based on the beamforming information.

20 Claims, 6 Drawing Sheets

ADAPTIVE INTERFERENCE ALIGNMENT PRECODING AND DECODING TO PREVENT MULTI-CELL INTERFERENCE

CROSS-REFERENCE TO RELATED APPLICATION

This application claims the benefit under 35 U.S.C. §119 (a) of a Korean Patent Application No. 10-2009-0025199, filed Mar. 25, 2009, in the Korean Intellectual Property Office, the entire disclosure of which is incorporated herein by reference for all purposes.

BACKGROUND

1. Field

The following description relates to a technology to control an interference that may affect a mobile station due to a signal transmitted by a plurality of base stations in a communication system.

2. Description of the Related Art

In general, a mobile station in a communication system may receive an interference signal from base stations adjacent to a base station serving the mobile station. An interference signal may reduce transmission efficiency such as a data rate of a transmission signal, and the like.

For example, a mobile station located in an edge of a cell may experience interference from base stations of an adjacent cell more significantly in comparison with a mobile station located towards a center of the cell.

Research on a method of improving a system capacity in a multi-user interference channel environment where a plurality of base stations simultaneously transmits data to a plurality of mobile stations while interfering with each other, has been conducted.

In general, a strength of an interference signal received by each mobile station may vary depending on a distance between each of the mobile stations and base stations in an actual environment.

SUMMARY

According to one aspect, a mobile station includes an interference determination unit configured to receive a pilot signal from a plurality of base stations and determine an effective interference based on the pilot signal; and a feedback configured unit to feed back channel information of a channel to a service base station, the channel being between the mobile station and at least one base station transmitting a pilot signal, determined as the effective interference, from among the plurality of base stations. The plurality of base stations may receive the channel information from a plurality of mobile stations including the mobile station, and transmit the received channel information to a network control apparatus, and the network control apparatus may generate beamforming information, associated with an interference alignment, based on a number of effective interferences with respect to the plurality of mobile stations, and transmit the beamforming information to the plurality of base stations.

The network control apparatus may set a unique signal space for each of the plurality of mobile stations, and generate the beamforming information to enable the effective interferences of each of the plurality of mobile stations to be aligned in the signal space set for each of the plurality of mobile stations.

The plurality of base stations may receive the beamforming information from the network control apparatus, and transmit a signal to the plurality of mobile stations based on the beamforming information.

An interference elimination unit may be configured to identify interferences aligned in the signal space set by the network control apparatus, and perform an interference prevention when the signal is received from the plurality of base stations.

When a number of antennas of the plurality of base stations is greater than a number of antennas used to generate the beamforming information, the plurality of base stations may provide a service to another mobile station excluding the plurality of mobile stations, using an antenna excluding the antennas, used to generate the beamforming information, from among the antennas of the plurality of base stations.

The network control apparatus generates the beamforming information to enable an interference of each of the plurality of mobile stations to be aligned in the signal space, the interference of each of the plurality of mobile stations occurring when the plurality of base stations provides the service to the other mobile station.

When a number of antennas of the plurality of base stations is less than a number of antennas used to generate the beamforming information, the network control apparatus may select at least one interference from the effective interferences of the plurality of mobile stations in an order of interference having a smallest magnitude based on the number of antennas of the plurality of base stations, and generate the beamforming information regardless of whether the at least one selected interference is aligned in the signal space.

When a number of antennas of the plurality of base stations is less than a number of antennas used to generate the beamforming information, the network control apparatus may generate the beamforming information to enable a sum of power of the effective interferences of the plurality of mobile stations to be minimum.

According to another aspect, a network control apparatus includes an information receiving unit configured to receive channel information of a plurality of mobile stations from a plurality of base stations; an information generation unit configured to generate beamforming information, associated with an interference alignment of the plurality of mobile stations, based on a number of antennas of the plurality of base stations based on the channel information; and an information transmission unit configured to transmit the beamforming information to the plurality of base stations, wherein the plurality of base stations transmits a signal to the plurality of mobile stations based on the beamforming information.

The information generation unit may set a unique signal space for each of the plurality of mobile stations and generate the beamforming information to enable an interference of each of the plurality of mobile stations to be aligned in the signal space set for each of the plurality of mobile stations.

The plurality of mobile stations may receive a pilot signal from the plurality of base stations, determine an effective interference based on the pilot signal, and feed back, to a service base station, the channel information of a channel with at least one base station transmitting a pilot signal, determined as the effective interference, from among the plurality of base stations.

The information generation unit may generate the beamforming information regardless of whether interferences, different from the effective interference, from among the interference of each of the plurality of mobile stations are aligned in the signal space.

When a number of antennas of the plurality of base stations is greater than a number of antennas used to generate the beamforming information, the plurality of base stations may provide a service to another mobile station excluding the plurality of mobile stations, using an antenna excluding the antennas, used to generate the beamforming information, from among the antennas of the plurality of base stations.

The information generation unit may generate the beamforming information to enable an interference of each of the plurality of mobile stations to be aligned in the signal space, the interference of each of the plurality of mobile stations occurring when the plurality of base stations provides the service to the other mobile station.

When a number of antennas of the plurality of base stations is less than a number of antennas used to generate the beamforming information, the information generation unit may select at least one interference from the interferences of the plurality of mobile stations in an order of least interference based on the number of antennas of the plurality of base stations, and generates the beamforming information regardless of whether the at least one selected interference is aligned in the signal space.

When a number of antennas of the plurality of base stations is less than a number of antennas used to generate the beamforming information, the information generation unit may generate the beamforming information to enable a sum of power of the effective interferences of the plurality of mobile stations to be minimum.

Other features and aspects will be apparent from the following detailed description, the drawings, and the claims.

Figure 1:
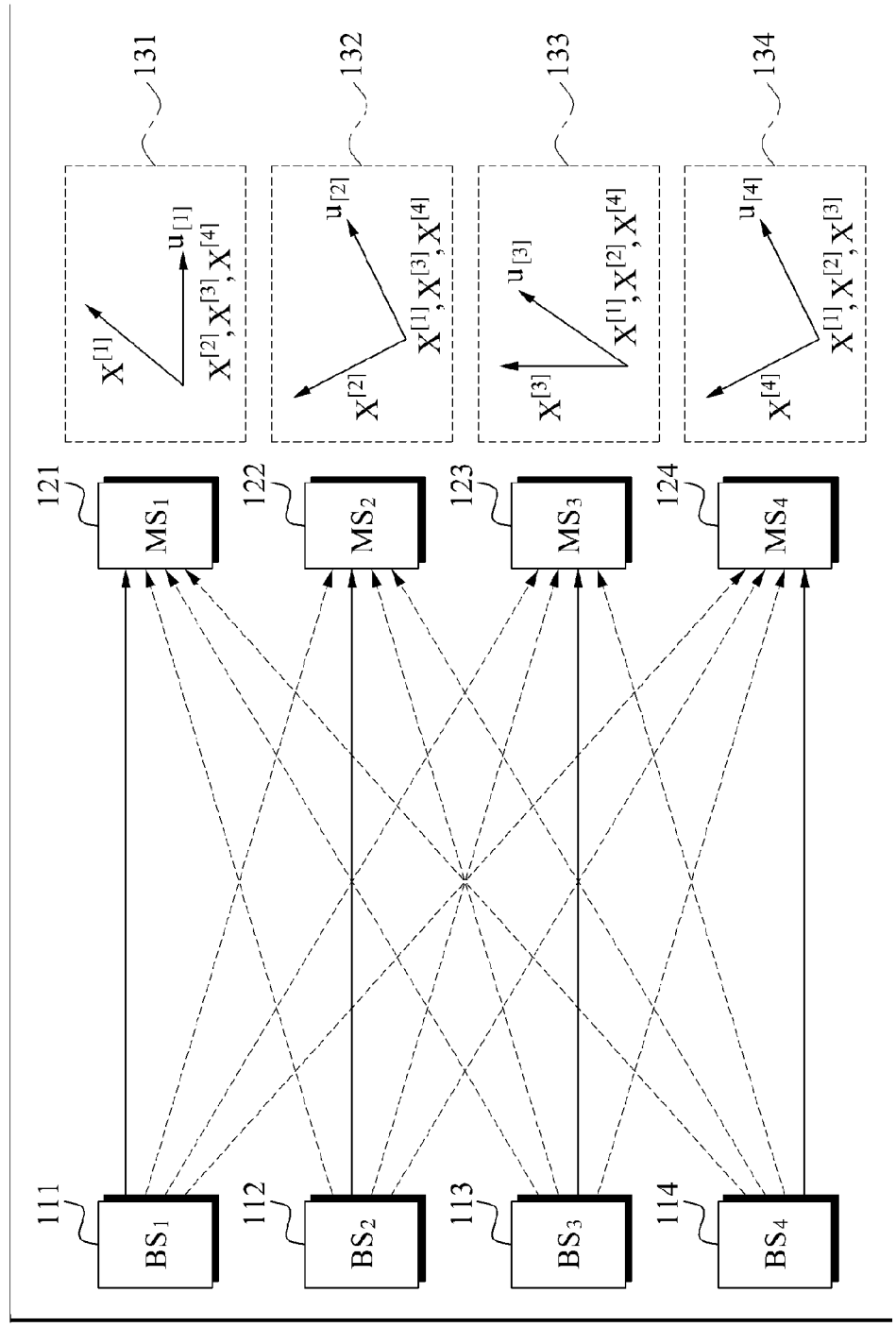
FIG. 1 is a conceptual diagram illustrating an exemplary communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, descriptions of well-known functions and constructions may be omitted for increased clarity and conciseness.

FIG. 1 illustrates an exemplary communication system.

A mobile station (MS) located in an edge of a cell may experience interference from a signal transmitted by a base station (BS) located in an adjacent cell, and the like.

For example, when it is assumed that a base station serving an $MS_1$ 121 is a $BS_1$ 111 (also referred to as a "service base station"), the $MS_1$ 121 may experience interference from signals transmitted by a $BS_2$ 112, a $BS_3$ 113, and a $BS_4$ 114.

Also, for example, when it is assumed that a service base station of an $MS_2$ 122 is the $BS_2$ 112, the $MS_2$ 122 may experience interference from signals transmitted by the $BS_1$ 111, the $BS_3$ 113, and the $BS_4$ 114.

Also, for example, when it is assumed that a service base station of an $MS_3$ 123 is the $BS_3$ 113, the $MS_3$ 123 may experience interference from signals transmitted by the $BS_1$ 111, the $BS_2$ 112, and the $BS_4$ 114.

Also, for example, when it is assumed that a service base station of an $MS_4$ 124 is the $BS_4$ 114, the $MS_4$ 124 may experience interference from signals transmitted by the $BS_1$ 111, the $BS_2$ 112, and the $BS_3$ 113.

Accordingly, it is desirable to appropriately control interference so that the $MS_1$ 121, the $MS_2$ 122, the $MS_3$ 123, and the $MS_4$ 124 may perform normal communication with their own service base stations. For this, interference occurring in each of the $MS_1$ 121, the $MS_2$ 122, the $MS_3$ 123, and the $MS_4$ 124 may be managed so as to enable each of the $MS_1$ 121, the $MS_2$ 122, the $MS_3$ 123, and the $MS_4$ 124 to prevent the interference.

A unique signal space for each of the $MS_1$ 121, the $MS_2$ 122, the $MS_3$ 123, and the $MS_4$ 124 may be set, and the interference occurring in each of the $MS_1$ 121, the $MS_2$ 122, the $MS_3$ 123, and the $MS_4$ 124 may be aligned in the signal space. Accordingly, each of the $MS_1$ 121, the $MS_2$ 122, the $MS_3$ 123, and the $MS_4$ 124 may more easily prevent the interference.

For example, it may be assumed that a signal $X^{[1]}$ transmitted by the $BS_1$ 111, a signal $X^{[2]}$ is transmitted by the $BS_2$ 112, a signal $X^{[3]}$ is transmitted by the $BS_3$ 113, and a signal $X^{[4]}$ is transmitted by the $BS_4$ 114.

In the $MS_1$ 121, for example, the signals $X^{[2]}$, $X^{[3]}$, and $X^{[4]}$ excluding the signal $X^{[1]}$ transmitted by the $BS_1$ 111, may be an interference signal. Accordingly, the interference signals may be aligned in a signal space $u_{[1]}$ as illustrated in a plot 131 of FIG. 1. The signal space $u_{[1]}$ may be set with respect to the $MS_1$ 121.

Also, in the $MS_2$ 122, for example, the signals $X^{[1]}$, $X^{[3]}$, and $X^{[4]}$ excluding the signal $X^{[2]}$ transmitted by the $BS_2$ 112, may be an interference signal. Accordingly, the interference signals may be aligned in a signal space $u_{[2]}$ as illustrated in a plot 132 of FIG. 1. The signal space $u_{[2]}$ may be set with respect to the $MS_2$ 122.

Also, in the $MS_3$ 123, for example, the signals $X^{[1]}$, $X^{[2]}$, and $X^{[4]}$ excluding the signal $X^{[3]}$ transmitted by the $BS_3$ 113, may be an interference signal. Accordingly, the interference signals may be aligned in a signal space $u_{[3]}$ as illustrated in a plot 133 of FIG. 1. The signal space $u_{[3]}$ may be set with respect to the $MS_3$ 123.

Also, in the $MS_4$ 124, for example, the signals $X^{[1]}$, $X^{[2]}$, and $X^{[3]}$ excluding the signal $X^{[4]}$ transmitted by the $BS_4$ 114, may be an interference signal. Accordingly, the interference signals may be aligned in a signal space $u_{[4]}$ as illustrated in a plot 134 of FIG. 1. The signal space $u_{[4]}$ may be set with respect to the $MS_4$ 124.

Here, the signal space may indicate a vector space, for example.

As described in the above examples, when the interference signals are aligned, each of the $MS_1$ 121, the $MS_2$ 122, the $MS_3$ 123, and the $MS_4$ 124 may process signals aligned in the signal space set with respect to each of the $MS_1$ 121, the $MS_2$ 122, the $MS_3$ 123, and the $MS_4$ 124, as an interference signal and thereby may perform interference prevention.

For example, the $MS_1$ 121 may process the signals aligned in the signal space $u_{[1]}$, as an interference signal, and thereby may perform interference prevention.

Figure 2:
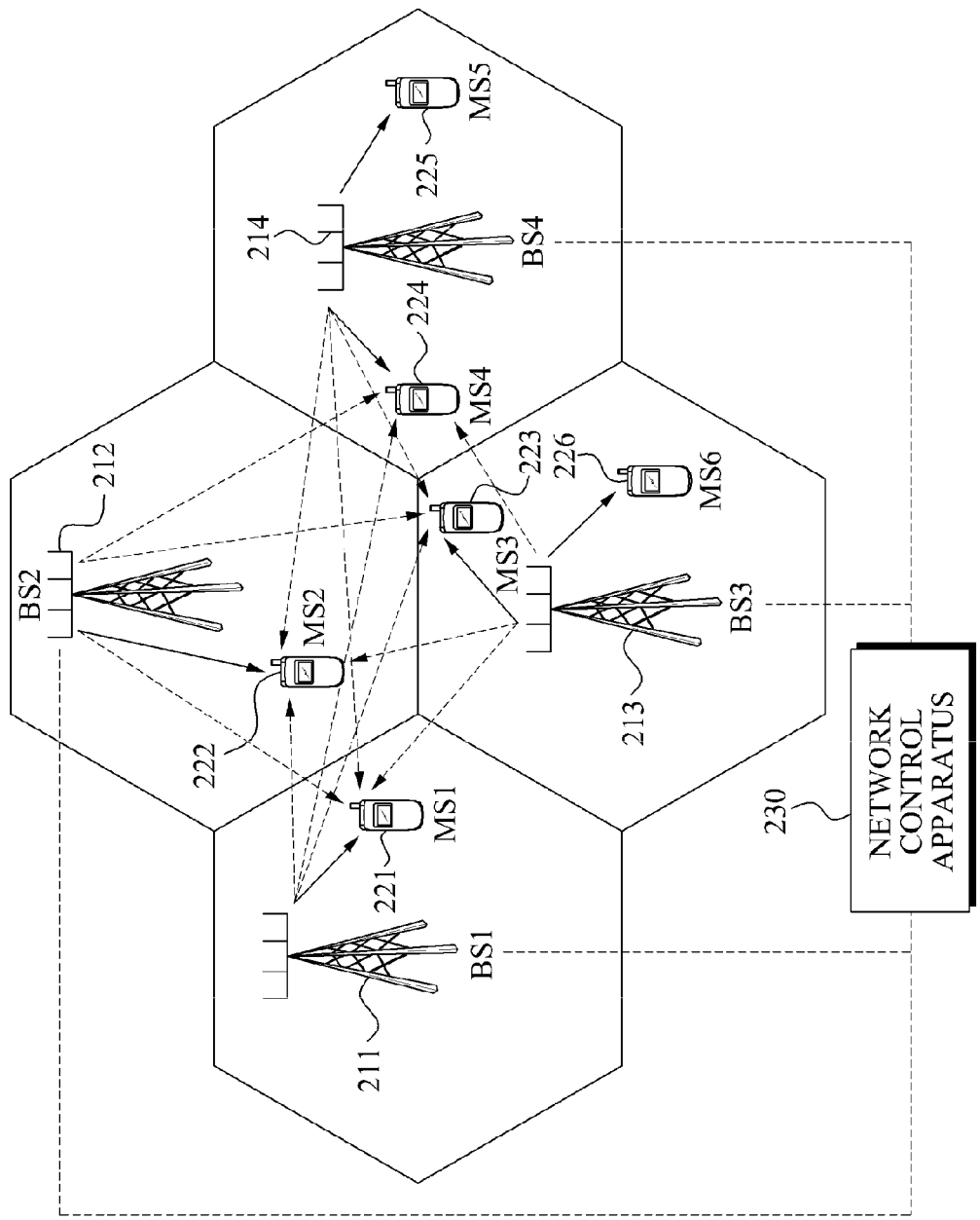
FIG. 2 is a conceptual diagram illustrating an exemplary cellular-based communication system.

FIG. 2 illustrates an exemplary cellular-based communication system.

The exemplary cellular-based communication system may include, for example, a BS (1) 211, a BS (2) 212, a BS (3) 213, a BS (4) 214, an MS (1) 221, an MS (2) 222, an MS (3) 223, an MS (4) 224, an MS (5) 225, an MS (6) 226, and a network control apparatus 230.

For exemplary purposes, it may be assumed that each of the BS (1) 211, the BS (2) 212, the BS (3) 213, and the BS (4) 214 has four antennas, and each of the MS (1) 221, the MS (2) 222, the MS (3) 223, the MS (4) 224, the MS (5) 225, and the MS (6) 226 has two antennas.

It may also be assumed, for exemplary purposes, that a service base station of the MS (1) 221 is the BS (1) 211, a service base station of the MS (2) 222 is the BS (2) 212, a service base station of the MS (3) 223 and the MS (6) 226 is the BS (3) 213, and a service base station of the MS (4) 224 and the MS (5) 225 is the BS (4) 214.

Also, it may be assumed, for example, that the MS (1) 221, the MS (2) 222, the MS (3) 223, and the MS (4) 224 are relatively located at an edge of each cell, and the MS (5) 225 and the MS (6) 226 are relatively located towards a center of each of the cells.

Since the MS (5) 225 and the MS (6) 226 are located towards a center of each of the cells, the MS (5) 225 and the MS (6) 226 may experience relatively less interference than the MS (1) 221, the MS (2) 222, the MS (3) 223, and the MS (4) 224.

Accordingly, exemplary implementation with respect to the MS (1) 221, the MS (2) 222, the MS (3) 223, and the MS (4) 224 and the BS (1) 211, the BS (2) 212, the BS (3) 213, and the BS (4) 214 is described below.

Each of the BS (1) 211, the BS (2) 212, the BS (3) 213, and the BS (4) 214 may simultaneously transmit a signal to each of the MS (1) 221, the MS (2) 222, the MS (3) 223, and the MS (4) 224. In this case, a signal model received by a $j^{th}$ MS may be represented as, $$Y^{[j]} = \sum_{i=1}^{K} H^{[j,i]} X^{[i]} + N^{[j]} \qquad \text{[Equation 1]}$$

where $H^{[j,i]}$ may denote a channel between an $i^{th}$ BS and the $j^{th}$ MS. For example, $H^{[1,1]}$ may denote a channel between the BS (1) 211 and the MS (1) 221.

Also, K may denote a number of BSs located in the communication system. Since it is assumed that the four BSs exist, K may be four.

Also, $X^{[i]}$ may denote a signal transmitted by the $i^{th}$ BS, and $N^{[j]}$ may denote a noise.

In this case, the signal $X^{[i]}$ transmitted by the BS may be represented as, $$X^{[i]} = v^{[i]} x^i \qquad \text{[Equation 2]}$$

where $x^i$ may denote data transmitted by the $i^{th}$ BS, and $v^{[i]}$ may denote a beamforming vector of the $i^{th}$ BS.

Each of the BS (1) 211, the BS (2) 212, the BS (3) 213, and the BS (4) 214 may transmit a pilot signal to each of the MS (1) 221, the MS (2) 222, the MS (3) 223, and the MS (4) 224.

In this case, for example, each of the MS (1) 221, the MS (2) 222, the MS (3) 223, and the MS (4) 224 may measure a received Signal to Noise Ratio (SNR) and an Interference to Noise Ratio (INR) based on the pilot signal.

The measured SNR and INR may be represented as,

TABLE 1

| | BS 1 | BS 2 | BS 3 | BS 4 |
|---|---|---|---|---|
| MS 1 | SNR = 10(dB) | INR = 13(dB) | INR = 9(dB) | INR = 8(dB) |
| MS 2 | INR = 12(dB) | SNR = 14(dB) | INR = 11(dB) | INR = 9(dB) |
| MS 3 | INR = 10(dB) | INR = 13(dB) | SNR = 11(dB) | INR = 8(dB) |
| MS 4 | INR = 6(dB) | INR = 11(dB) | INR = 12(dB) | SNR = 13(dB) |

Table 1 is provided for exemplary purposes, and describes the exemplary cellular-based communication system. Depending on exemplary embodiments, an SNR and INR measured by each of the MS (1) 221, the MS (2) 222, the MS (3) 223, and the MS (4) 224 may be different from Table 1.

Since the service base station of the MS (1) 221 is the BS (1) 211 in this example, a signal transmitted by each of the BS (2) 212, the BS (3) 213, and the BS (4) 214 may be an interference signal to the MS (1) 221.

Also, since the service base station of the MS (2) 222 is the BS (2) 212 in this example, a signal transmitted by each of the BS (1) 211, the BS (3) 213, and the BS (4) 214 may be an interference signal to the MS (2) 222.

Also, since the service base station of the MS (3) 223 is the BS (3) 213 in this example, a signal transmitted by each of the BS (1) 211, the BS (2) 212, and the BS (4) 214 may be an interference signal to the MS (3) 223.

Also, since the service base station of the MS (4) 224 is the BS (4) 214 in this example, a signal transmitted by each of the BS (1) 211, the BS (2) 212, and the BS (3) 213 may be an interference signal to the MS (4) 224.

Each of the MS (1) 221, the MS (2) 222, the MS (3) 223, and the MS (4) 224 may determine an effective interference based on the INR.

In this case, each of the MS (1) 221, the MS (2) 222, the MS (3) 223, and the MS (4) 224 may compare the INR and a predetermined value, and determine an interference where the INR is greater than the predetermined value, as the effective interference.

Subsequently, each of the MS (1) 221, the MS (2) 222, the MS (3) 223, and the MS (4) 224 may feed back, to each of the service base stations, channel information of an interference link with a BS, corresponding to the effective interference, from among the BS (1) 211, the BS (2) 212, the BS (3) 213, and the BS (4) 214.

For exemplary purposes, it may be assumed that the predetermined value is 3 dB.

When the predetermined value is 3 dB, the INR measured by each of the MS (1) 221, the MS (2) 222, the MS (3) 223, and the MS (4) 224 may be greater than the predetermined value, each of the MS (1) 221, the MS (2) 222, the MS (3) 223, and the MS (4) 224 may feed back, to each of the BS (1) 211, the BS (2) 212, the BS (3) 213, and the BS (4) 214, channel information associated with all interference links of each of the BS (1) 211, the BS (2) 212, the BS (3) 213, and the BS (4) 214.

When the channel information is received from each of the MS (1) 221, the MS (2) 222, the MS (3) 223, and the MS (4) 224, each of the BS (1) 211, the BS (2) 212, the BS (3) 213, and the BS (4) 214 may transmit the channel information to the network control apparatus 230.

The network control apparatus 230 may be a base station controller which is physically or logically spaced apart from the BS (1) 211, the BS (2) 212, the BS (3) 213, and the BS (4) 214. Also, the network control apparatus 230 may be included in at least one BS of the BS (1) 211, the BS (2) 212, the BS (3) 213, and the BS (4) 214, as a component module.

In this case, the network control apparatus 230 may set a unique signal space for each of the MS (1) 221, the MS (2) 222, the MS (3) 223, and the MS (4) 224 based on the channel information, and generate beamforming information to enable an interference of each of the MS (1) 221, the MS (2) 222, the MS (3) 223, and the MS (4) 224 to be aligned in the signal space.

For example, since a signal transmitted by each of the BS (2) 212, the BS (3) 213, and the BS (4) 214 may be an interference to the MS (1) 221, the network control apparatus 230 may set a signal space for the MS (1) 221, and generate the beamforming information to enable the signals, transmitted by the BS (2) 212, the BS (3) 213, and the BS (4) 214, to be aligned in the signal space for the MS (1) 221.

Also, for example, since a signal transmitted by each of the BS (1) 211, the BS (3) 213, and the BS (4) 214 may be an interference to the MS (2) 222, the network control apparatus 230 may set a signal space for the MS (2) 222, and generate the beamforming information to enable the signals, transmitted by the BS (1) 211, the BS (3) 213, and the BS (4) 214, to be aligned in the signal space for the MS (2) 222.

Also, for example, since a signal transmitted by each of the BS (1) 211, the BS (2) 212, and the BS (4) 214 may be an interference to the MS (3) 223, the network control apparatus 230 may set a signal space for the MS (3) 223, and generate the beamforming information to enable the signals, transmitted by the BS (1) 211, the BS (2) 212, and the BS (4) 214, to be aligned in the signal space for the MS (3) 223.

Also, for example, since a signal transmitted by each of the BS (1) 211, the BS (2) 212, and the BS (3) 213 may be an interference to the MS (4) 224, the network control apparatus 230 may set a signal space for the MS (4) 224, and generate the beamforming information to enable the signals, transmitted by the BS (1) 211, the BS (2) 212, and the BS (3) 213, to be aligned in the signal space for the MS (4) 224.

The network control apparatus 230 may generate the beamforming information for the interference alignment using Equation 3 given as below.

Terminal 1: $u_{[1]} = H^{[12]}v^{[2]} = \frac{1}{\alpha_1}H^{[13]}v^{[3]} = \frac{1}{\alpha_2}H^{[14]}v^{[4]}$ [Equation 3]

Terminal 2: $u_{[2]} = H^{[21]}v^{[1]} = \frac{1}{\beta_1}H^{[23]}v^{[3]} = \frac{1}{\beta_2}H^{[24]}v^{[4]}$ Terminal 3: $u_{[3]} = H^{[31]}v^{[1]} = \frac{1}{\gamma_1}H^{[32]}v^{[2]} = \frac{1}{\gamma_2}H^{[34]}v^{[4]}$ Terminal 4: $u_{[4]} = H^{[41]}v^{[1]} = \frac{1}{\delta_1}H^{[42]}v^{[2]} = \frac{1}{\delta_2}H^{[43]}v^{[3]}$ That is, the network control apparatus 230 may set a relation between a signal space $u_{[1]}$ for the MS (1) 221 and each beamforming vector, $v^{[2]}$, $v^{[3]}$, and $v^{[4]}$ to enable the signals transmitted by the BS (2) 212, the BS (3) 213, and the BS (4) 214 to be aligned in the signal space $u_{[1]}$.

Also, the network control apparatus 230 may set a relation between a signal space $u_{[2]}$ for the MS (2) 222 and each beamforming vector, $v^{[1]}$, $v^{[3]}$, and $v^{[4]}$ to enable the signals transmitted by the BS (1) 211, the BS (3) 213, and the BS (4) 214 to be aligned in the signal space $u_{[2]}$.

Also, the network control apparatus 230 may set a relation between a signal space $u_{[3]}$ for the MS (3) 223 and each beamforming vector, $v^{[1]}$, $v^{[2]}$, and $v^{[4]}$ to enable the signals transmitted by the BS (1) 211, the BS (2) 212, and the BS (4) 214 to be aligned in the signal space $u_{[3]}$.

Also, the network control apparatus 230 may set a relation between a signal space $u_{[4]}$ for the MS (4) 224 and each beamforming vector, $v^{[1]}$, $v^{[2]}$, and $v^{[3]}$ to enable the signals transmitted by the BS (1) 211, the BS (2) 212, and the BS (3) 213 to be aligned in the signal space $u_{[4]}$.

Here, a variable such as $\alpha$, $\beta$, $\gamma$, and $\delta$ may indicate that a strength of the signals transmitted by the BS (1) 211, the BS (2) 212, the BS (3) 213, and the BS (4) 214 may change.

When the relation of Equation 3 is set, the network control apparatus 230 may calculate $v^{[1]}$, $v^{[2]}$, $v^{[3]}$, $v^{[4]}$, $u_{[1]}$, $u_{[1]}$, $u_{[3]}$, and $u_{[4]}$ using Equation 3, and generate the beamforming information.

Equation 3 may be represented as a determinant given as below.

$$\begin{bmatrix} \alpha_1 I_N & 0 & 0 & 0 & 0 & -H_{[12]} & 0 & 0 \\ \alpha_2 I_N & 0 & 0 & 0 & 0 & 0 & -H_{[13]} & 0 \\ \alpha_3 I_N & 0 & 0 & 0 & 0 & 0 & 0 & -H_{[14]} \\ 0 & \alpha_4 I_N & 0 & 0 & -H_{[21]} & 0 & 0 & 0 \\ 0 & \alpha_5 I_N & 0 & 0 & 0 & 0 & -H_{[23]} & 0 \\ 0 & \alpha_6 I_N & 0 & 0 & 0 & 0 & 0 & -H_{[24]} \\ 0 & 0 & \alpha_7 I_N & 0 & -H_{[31]} & 0 & 0 & 0 \\ 0 & 0 & \alpha_8 I_N & 0 & 0 & -H_{[32]} & 0 & 0 \\ 0 & 0 & \alpha_9 I_N & 0 & 0 & 0 & 0 & -H_{[34]} \\ 0 & 0 & 0 & \alpha_{10} I_N & -H_{[41]} & 0 & 0 & 0 \\ 0 & 0 & 0 & \alpha_{11} I_N & 0 & -H_{[42]} & 0 & 0 \\ 0 & 0 & 0 & \alpha_{12} I_N & 0 & 0 & -H_{[43]} & 0 \end{bmatrix} \begin{bmatrix} u^{[1]} \\ u^{[2]} \\ u^{[3]} \\ u^{[4]} \\ v^{[1]} \\ v^{[2]} \\ v^{[3]} \\ v^{[4]} \end{bmatrix} = \hat{Y}\hat{x} = 0$$

[Equation 4]

where $\hat{Y}(\alpha_i)$ is the $(4\times3\times2)\times(\Sigma_{k=1}^{4}M_k+8)$ dimensional unified system matrix with unknown variables $\alpha_i$, (i=1, 2, . . . , 12). Also it may be assumed that each beamforming vectors and interference containing vectors has unit norm constraint, i.e., $|v^{[k]}|^2=1$ and $|u^{[k]}|^2=1$ (k=1, 2, 3, 4). Therefore, total 32(=24+8) nonlinear equations and $12+\Sigma_{k=1}^{4}M_k+8$ unknown variables exist in equation 3 and power constraint conditions. From the Bezout's theorem, which shows that there exists at least one common solution for the system of $m$ generic polynomial equations with $m$ variables, if $\Sigma_{k=1}^{4}M_k\geq 12$, we can obtain the beamforming vectors for interference alignment, $v^{[k]}$, and interference containing vectors, $u^{[k]}$ by solving this unified as Newton's type nonlinear equation solving tool. Note that the design of interference containing vectors $u^{[k]}$ is equivalently thought as the design of receive beamforming vectors, $w^{[k]}$, to prevent the interference signals because $w^{[k]}$ is constructed as satisfying condition $w^{[k]^H}u^{[k]}=0$ (k=1, 2, 3, K).

The network control apparatus 230 may convert the relation of Equation 3 into the determinant of Equation 4, and thereby may calculate $v^{[1]}$, $v^{[2]}$, $v^{[3]}$, $v^{[4]}$, $u_{[1]}$, $u_{[2]}$, $u_{[3]}$, and $u_{[4]}$.

In this case, for example, the network control apparatus 230 may set the variable such as $\alpha$, $\beta$, $\gamma$, and $\delta$ as 1, construct the determinant of Equation 4 as a linear equation, and thereby may calculate a solution of Equation 4.

Beamforming may be available when a total number of antennas of the BS (1) 211, the BS (2) 212, the BS (3) 213, and the BS (4) 214 is equal to or greater than 17, since a number of relations is to be identical to a number of unknown quantities, also referred to as "unknowns."

For example, the number of relations deduced from Equation 4 may be 24, and eight unknowns may be deduced from $u_{[1]}$, $u_{[2]}$, $u_{[3]}$, and $u_{[4]}$ which is a 2×1 matrix. Accordingly, a total of 16 unknowns are to be deduced from $v^{[1]}$, $v^{[2]}$, $v^{[3]}$, and $v^{[4]}$ to enable the number of relations to be identical to the number of unknowns.

Accordingly, the total number of antennas of the BS (1) 211, the BS (2) 212, the BS (3) 213, and the BS (4) 214 is to be 16 to deduce 16 unknowns from $v^{[1]}$, $v^{[2]}$, $v^{[3]}$, and $v^{[4]}$. Also, at least one row is to be added to $\hat{Y}$ so that an error that calculates $\hat{X}$ as a zero matrix by multiplying both members of Equation 4 with an inverse matrix of $\hat{Y}$ may be avoided. Accordingly, the total number of antennas of the BS (1) 211, the BS (2) 212, the BS (3) 213, and the BS (4) 214 is to be equal to or greater than 17.

As described in the examples above, the network control apparatus 230 may set the variable such as $\alpha$, $\beta$, $\gamma$, and $\delta$ as 1, and calculate $v^{[1]}$, $v^{[2]}$, $v^{[3]}$, $v^{[4]}$, $u_{[1]}$, $u_{[2]}$, $u_{[3]}$, and $u_{[4]}$ using Equation 4. However, the network control apparatus 230 may also calculate $v^{[1]}$, $v^{[2]}$, $v^{[3]}$, $v^{[4]}$, $u_{[1]}$, $u_{[2]}$, $u_{[3]}$, and $u_{[4]}$ by applying an algorithm to obtain the solution of the linear equation to Equation 4, without setting a predetermined value for the variable such as $\alpha$, $\beta$, $\gamma$, and $\delta$.

In this instance, the network control apparatus 230 may calculate $v^{[1]}$, $v^{[2]}$, $v^{[3]}$, $v^{[4]}$, $u_{[1]}$, $u_{[2]}$, $u_{[3]}$, and $u_{[4]}$ from Equation 4 using Newton's method.

The network control apparatus 230 may obtain an optimum solution with respect to $v^{[1]}$, $v^{[2]}$, $v^{[3]}$, $v^{[4]}$, $u_{[1]}$, $u_{[2]}$, $u_{[3]}$, and $u_{[4]}$ from Equation 4, and thereby may reduce the number of antennas used to calculate $v^{[1]}$, $v^{[2]}$, $v^{[3]}$, $v^{[4]}$, $u_{[1]}$, $u_{[2]}$, $u_{[3]}$, and $u_{[4]}$.

According to an exemplary embodiment, when the total number of antennas of the BS (1) 211, the BS (2) 212, the BS (3) 213, and the BS (4) 214 is 12, as a result of obtaining the optimum solution with respect to $v^{[1]}$, $v^{[2]}$, $v^{[3]}$, $v^{[4]}$, $u_{[1]}$, $u_{[2]}$, $u_{[3]}$, and $u_{[4]}$ applying the algorithm, the beamforming for the interference alignment may be available.

Accordingly, each of the BS (1) 211, the BS (2) 212, the BS (3) 213, and the BS (4) 214 may provide a service to the MS (1) 221, the MS (2) 222, the MS (3) 223, and the MS (4) 224 using three antennas for each of the BS (1) 211, the BS (2) 212, the BS (3) 213, and the BS (4) 214.

In this instance, each of the BS (1) 211, the BS (2) 212, the BS (3) 213, and the BS (4) 214 may have one remaining antenna, and thereby may provide a service to an MS located towards a center of a cell using the remaining antenna.

For example, the BS (3) 213 may provide a service to the MS (6) 226 using the remaining antenna.

Also, the BS (4) 214 may provide a service to the MS (5) 225 using the remaining antenna.

However, when the BS (3) 213 may provide a service to the MS (6) 226 using the remaining antenna, an interference may occur with respect to the MS (3) 223. Accordingly, the network control apparatus 230 may generate the beamforming information to enable a signal to be aligned in the signal space $u_{[3]}$ set in the MS (3) 223. Here, the signal may be transmitted by the BS (3) 213 to the MS (6) 226 using the remaining antenna.

For example, when a beamforming vector with respect to the signal, transmitted by the BS (3) 213 to the MS (6) 226 using the remaining antenna, is $v^{[6]}$, and a channel between the BS (3) 213 and the MS (6) 226 is $H^{[63]}$, the network control apparatus 230 may construct $v^{[6]}$ to satisfy a relation of Equation 5.

$$H^{[63]}v^{[3]}=u_{[3]} \quad \text{[Equation 5]}$$

Similarly, when the BS (4) 214 may provide a service to the MS (5) 225 using the remaining antenna, an interference may occur to the MS (4) 224. Accordingly, the network control apparatus 230 may generate the beamforming information to enable a signal to be aligned in the signal space $u_{[4]}$ set in the MS (4) 224. Here, the signal may be transmitted by the BS (4) 214 to the MS (5) 225 using the remaining antenna.

For example, when a beamforming vector with respect to the signal, transmitted by the BS (4) 214 to the MS (5) 225 using the remaining antenna, is $v^{[5]}$, and a channel between the BS (4) 214 and the MS (5) 225 is $H^{[54]}$, the network control apparatus 230 may construct $v^{[5]}$ to satisfy a relation of Equation 6.

$$H^{[54]}v=U_{[4]} \quad \text{[Equation 6]}$$

The network control apparatus 230 may generate the beamforming information through the above-described operations, and transmit the beamforming information to the BS (1) 211, the BS (2) 212, the BS (3) 213, and the BS (4) 214.

In this case, the BS (1) 211, the BS (2) 212, the BS (3) 213, and the BS (4) 214 may receive the beamforming information, and transmit a signal to the MS (1) 221, the MS (2) 222, the MS (3) 223, and the MS (4) 224 based on the beamforming information.

When the beamforming information is received from the BS (1) 211, the BS (2) 212, the BS (3) 213, and the BS (4) 214, the MS (1) 221, the MS (2) 222, the MS (3) 223, and the MS (4) 224 may reduce or eliminate the interference aligned in each of the set signal spaces.

Since a number of antennas of BSs in the cellular-based communication system described in the exemplary embodiment is sufficient, beamforming for an interference alignment may be available.

However, in a femtocell-based communication system, beamforming for the interference alignment may not be available, since a number of antennas of a BS may be limited as opposed to the exemplary cellular-based communication system described above.

For example, as described in an exemplary embodiment, when a number of MSs associated with the interference alignment is four, a total number of antennas of BSs is to be at least 12.

Accordingly, when the number of antennas of BSs is less than 12, beamforming for the interference alignment may not be available.

Thus, a method of performing the interference alignment in a communication system such as a femtocell where a number of antennas of BSs is limited is described below.

Figure 3:
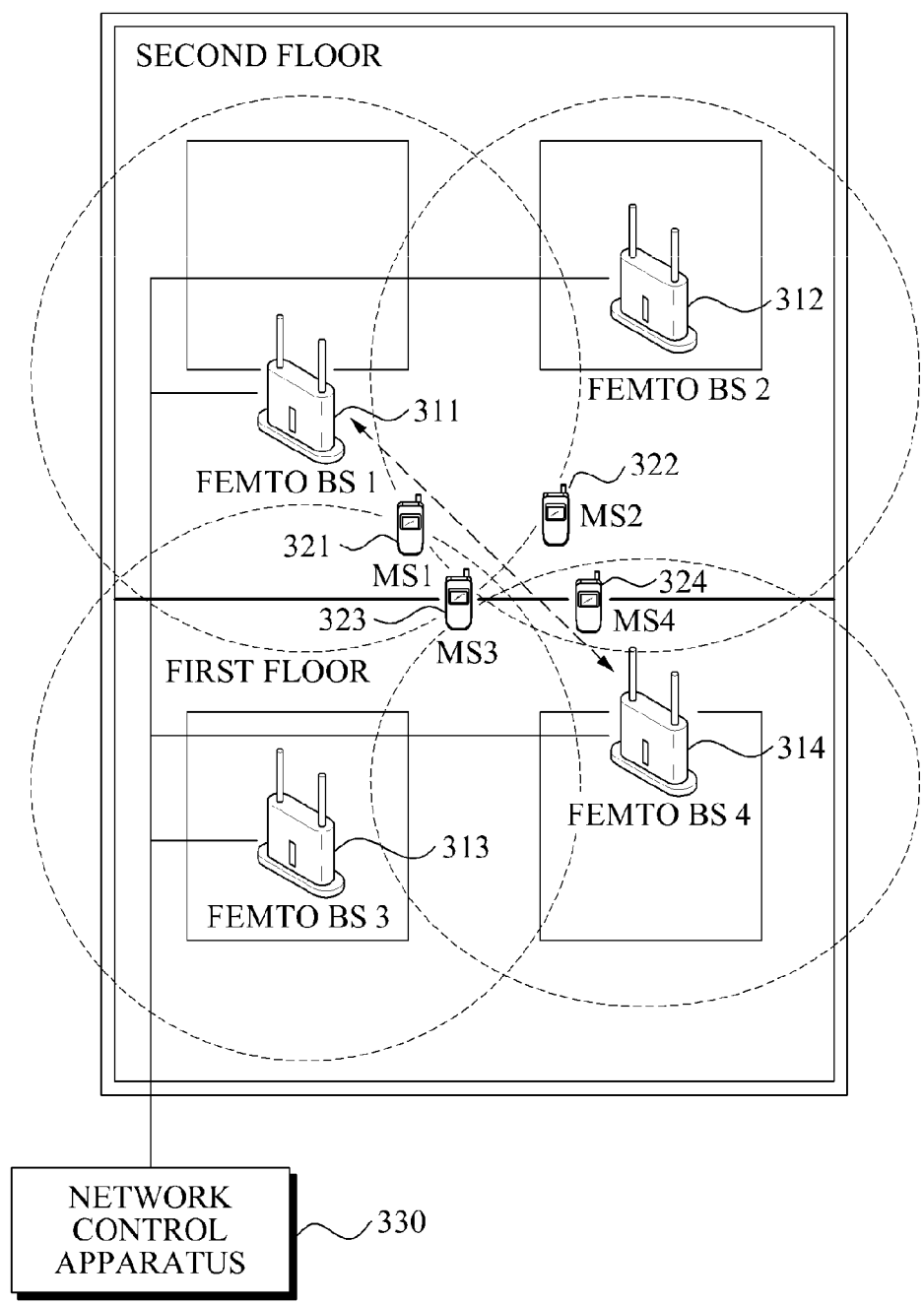
FIG. 3 is a conceptual diagram illustrating an exemplary femtocell-based communication system.

FIG. 3 illustrates an exemplary femtocell-based communication system.

The exemplary femtocell-based communication system may include a BS (1) 311, a BS (2) 312, a BS (3) 313, a BS (4) 314, an MS (1) 321, an MS (2) 322, an MS (3) 323, an MS (4) 324, and a network control apparatus 330.

For exemplary purposes, it may be assumed that a service base station of the MS (1) 321 is the BS (1) 311, a service base station of the MS (2) 322 is the BS (2) 312, a service base station of the MS (3) 323 is the BS (3) 313, and a service base station of the MS (4) 324 is the BS (4) 314.

Also, it may be assumed, for example, that each of the BS (1) 311, the BS (2) 312, the BS (3) 313, and the BS (4) 314 has two antennas, and each of the MS (1) 321, the MS (2) 322, the MS (3) 323, and the MS (4) 324 has two antennas.

Each of the BS (1) 311, the BS (2) 312, the BS (3) 313, and the BS (4) 314 may simultaneously transmit a signal to each of the MS (1) 321, the MS (2) 322, the MS (3) 323, and the MS (4) 324. In this instance, a signal model received by a $j^{th}$ MS may be represented as, $$Y^{[j]} = \sum_{i=1}^{K} H^{[j,i]} X^{[i]} + N^{[j]}$$ [Equation 7]

where $H^{[j,i]}$ may denote a channel between an $i^{th}$ BS and the $j^{th}$ MS. For example, may denote a channel between the BS (1) 311 and the MS (1) 321.

Also, K may denote a number of BSs located in the communication system. Since it is assumed that the four BSs exist, K may be four.

Also, $X^{[i]}$ may denote a signal transmitted by the $i^{th}$ BS, and $N^{[j]}$ may denote a noise.

In this instance, the signal $X^{[i]}$ transmitted by the $i^{th}$ BS may be represented as, $$X^{[i]} = v^{[i]} x^i$$ [Equation 8]

where $x^i$ may denote data transmitted by the $i^{th}$ BS, $v^{[i]}$ may denote a beamforming vector of the $i^{th}$ BS.

Each of the BS (1) 311, the BS (2) 312, the BS (3) 313, and the BS (4) 314 may transmit a pilot signal to each of the MS (1) 321, the MS (2) 322, the MS (3) 323, and the MS (4) 324.

In this case, each of the MS (1) 321, the MS (2) 322, the MS (3) 323, and the MS (4) 324 may measure an SNR and an INR based on the received pilot signal.

The measured SNR and INR may be represented as,

TABLE 2

| | BS 1 | BS 2 | BS 3 | BS 4 |
|---|---|---|---|---|
| MS 1 | SNR = 10(dB) | INR = 13(dB) | INR = 9(dB) | INR = 2(dB) |
| MS 2 | INR = 12(dB) | SNR = 14(dB) | INR = 11(dB) | INR = 9(dB) |
| MS 3 | INR = 10(dB) | INR = 13(dB) | SNR = 11(dB) | INR = 8(dB) |
| MS 4 | INR = 4(dB) | INR = 11(dB) | INR = 12(dB) | SNR = 13(dB) |

Table 2 is for exemplary purposes and describes the exemplary femtocell-based communication system. According to another exemplary embodiment, an SNR and INR measured by each of the MS (1) 321, the MS (2) 322, the MS (3) 323, and the MS (4) 324 may vary.

With reference to the examples in Table 2, since the service base station of the MS (1) 321 is the BS (1) 311, a signal transmitted by each of the BS (2) 312, the BS (3) 313, and the BS (4) 314 may be an interference signal to the MS (1) 321.

Also, for example, since the service base station of the MS (2) 322 is the BS (2) 312, a signal transmitted by each of the BS (1) 311, the BS (3) 313, and the BS (4) 314 may be an interference signal to the MS (2) 322.

Also, for example, since the service base station of the MS (3) 323 is the BS (3) 313, a signal transmitted by each of the BS (1) 311, the BS (2) 312, and the BS (4) 314 may be an interference signal to the MS (3) 323.

Also, for example, since the service base station of the MS (4) 324 is the BS (4) 314, a signal transmitted by each of the BS (1) 311, the BS (2) 312, and the BS (3) 313 may be an interference signal to the MS (4) 324.

Each of the MS (1) 321, the MS (2) 322, the MS (3) 323, and the MS (4) 324 may determine an effective interference based on the INR.

In this case, each of the MS (1) 321, the MS (2) 322, the MS (3) 323, and the MS (4) 324 may compare the INR and a predetermined value, and determine an interference where the INR is greater than the predetermined value, as the effective interference.

Subsequently, each of the MS (1) 321, the MS (2) 322, the MS (3) 323, and the MS (4) 324 may feed back, to each of the service base stations, channel information of an interference link with a BS, corresponding to the effective interference, from among the BS (1) 311, the BS (2) 312, the BS (3) 313, and the BS (4) 314.

For exemplary purposes, it may be assumed that the predetermined value is 3 dB.

When the predetermined value is 3 dB, an INR with respect to an interference signal transmitted by the BS (4) 314 to the MS (1) 321 may be less than the predetermined value, and the MS (1) 321 may not determine that the interference signal is the effective interference.

Accordingly, the MS (1) 321 may not feed back, to the BS (1) 311, channel information of an interference link between the BS (4) 314 to the MS (1) 321.

In this case, each of the MS (1) 321, the MS (2) 322, the MS (3) 323, and the MS (4) 324 may feed back, to each of the BS (1) 311, the BS (2) 312, the BS (3) 313, and the BS (4) 314, channel information excluding the channel information of the interference link between the BS (4) 314 to the MS (1) 321.

When channel information is received from each of the MS (1) 321, the MS (2) 322, the MS (3) 323, and the MS (4) 324, each of the BS (1) 311, the BS (2) 312, the BS (3) 313, and the BS (4) 314 may transmit the channel information to the network control apparatus 330.

The network control apparatus 330 of FIG. 3 may be a base station controller which is physically or logically spaced apart from the BS (1) 311, the BS (2) 312, the BS (3) 313, and the BS (4) 314. Also, the network control apparatus 330 may be included in at least one BS of the BS (1) 311, the BS (2) 312, the BS (3) 313, and the BS (4) 314, as a component module.

In this case, the network control apparatus 330 may determine whether to perform the interference alignment, based on a number of antennas of the BS (1) 311, the BS (2) 312, the BS (3) 313, and the BS (4) 314.

As described in an exemplary embodiment, when the number of BSs is four, and the number of MSs to be aligned is four, the total number of antennas of BSs should be at least 12 to perform the interference alignment with respect to all interferences that affect the MSs.

In this example, since the number of BSs is four, and the number of MSs is four, a total number of antennas of the BS (1) 311, the BS (2) 312, the BS (3) 313, and the BS (4) 314 is to be equal to or greater than 12 to perform the interference alignment with respect to all interferences occurring in the MS (1) 321, the MS (2) 322, the MS (3) 323, and the MS (4) 324.

However, since it is assumed, in this example, that each of the BS (1) 311, the BS (2) 312, the BS (3) 313, and the BS (4) 314 has two antennas, the total number of antennas is eight. Accordingly, the interference alignment may not be performed with respect to all the interferences occurring in the MS (1) 321, the MS (2) 322, the MS (3) 323, and the MS (4) 324.

Accordingly, it may be assumed, for exemplary purposes, that the relation of Equation 4 is generated so that the network control apparatus 330 may generate beamforming information.

In this case, the number of relations deduced from Equation 4 may be 24, and eight unknowns may be deduced from $u_{[1]}$, $u_{[2]}$, $u_{[3]}$, and $u_{[4]}$ which is a 2×1 matrix.

Accordingly, although the relation of Equation 4 is calculated as a linear equation, at least 12 unknowns are to be deduced from $v^{[1]}$, $v^{[2]}$, $v^{[3]}$, and $v^{[4]}$ to obtain a solution of Equation 4.

However, it is assumed that the total number of antennas of the BS (1) 311, the BS (2) 312, the BS (3) 313, and the BS (4) 314 is eight, only eight unknowns may be deduced from $v^{[1]}$, $v^{[2]}$, $v^{[3]}$, and $v^{[4]}$.

That is, at least four more antennas are to be used to perform the interference alignment with respect to all the interferences occurring in the MS (1) 321, the MS (2) 322, the MS (3) 323, and the MS (4) 324.

However, when the number of relations deduced from Equation 4 is 20 as opposed to 24, the interference alignment may be performed although the total number of antennas of the BS (1) 311, the BS (2) 312, the BS (3) 313, and the BS (4) 314 is eight.

That is, when the BS (1) 311, the BS (2) 312, the BS (3) 313, and the BS (4) 314 perform the interference alignment with respect to remaining interferences excluding a few interferences from among all the interferences occurring in the MS (1) 321, the MS (2) 322, the MS (3) 323, and the MS (4) 324, the interference alignment may be partially performed although the total number of antennas of the BS (1) 311, the BS (2) 312, the BS (3) 313, and the BS (4) 314 is insufficient.

Accordingly, the network control apparatus 330 may generate the beamforming information to enable the interference alignment to be performed with respect to only particular interferences of all the interferences occurring in the MS (1) 321, the MS (2) 322, the MS (3) 323, and the MS (4) 324, based on the number of antennas of the BS (1) 311, the BS (2) 312, the BS (3) 313, and the BS (4) 314.

In this case, since the MS (1) 321, the MS (2) 322, the MS (3) 323, and the MS (4) 324 have determined the effective interference from among all the interferences occurring in the MS (1) 321, the MS (2) 322, the MS (3) 323, and the MS (4) 324, the network control apparatus 330 may select an interference to be aligned from the effective interferences, based on the number of antennas of the BS (1) 311, the BS (2) 312, the BS (3) 313, and the BS (4) 314. Here, the effective interference may be singular or plural.

A number of interference links for exclusion from all interference links occurring in the MS (1) 321, the MS (2) 322, the MS (3) 323, and the MS (4) 324, based on the number of antennas of the BS (1) 311, the BS (2) 312, the BS (3) 313, and the BS (4) 314 may be represented as, $$L_{req} \geq K(K-1) - M_{tot} \quad \text{[Equation 9]}$$

where K may denote the number of BSs, $M_{tot}$ may denote the total number of antennas of the BSs, and N may denote a number of antennas of a single MS.

Also, a constant '4' may vary depending on the number of MSs. Since the number of MSs is four, the constant may be four.

Since the number of BSs is four, the total number of antennas of the BSs is eight, and the number of MSs is four, $L_{req}$ may be two.

That is, the network control apparatus 330 may generate the beamforming information to enable the interference alignment to be performed with respect to ten interferences from among all the 12 interferences that may occur in the MS (1) 321, the MS (2) 322, the MS (3) 323, and the MS (4) 324.

In this exemplary instance, each of the MS (1) 321, the MS (2) 322, the MS (3) 323, and the MS (4) 324 has excluded the channel information of the interference link between the BS (4) 314 to the MS (1) 321, when feeding back the channel information to the BS (1) 311, the BS (2) 312, the BS (3) 313, and the BS (4) 314, the network control apparatus 330 may additionally exclude only one interference link from the remaining 11 interference links.

In this case, the network control apparatus 330 may additionally exclude an interference link having a minimum INR from the remaining 11 interference links.

Through this, an effect where the excluded two interferences affect the MS (1) 321, the MS (2) 322, the MS (3) 323, and the MS (4) 324 may be reduced.

Since an INR of an interference signal, transmitted to the MS (4) 324 through an interference link between the BS (1) 311 to the MS (4) 324 from among the remaining 11 interference links, may be minimum, the network control apparatus 330 may exclude the interference link between the BS (1) 311 to the MS (4) 324 from among the remaining 11 interference links.

Since the effective interferences become ten, the network control apparatus 330 may generate the beamforming information for the interference alignment based on the effective interferences.

In this case, the network control apparatus 330 may generate the beamforming information using Equation 10 as below.

$$\text{Terminal 1: } u_{[1]} = \frac{1}{\alpha_1} H^{[12]} v^{[2]} = \frac{1}{\alpha_2} H^{[13]} v^{[3]} \quad \text{[Equation 10]}$$

$$\text{Terminal 2: } u_{[2]} = \frac{1}{\alpha_3} H^{[21]} v^{[1]} = \frac{1}{\alpha_4} H^{[23]} v^{[3]} = \frac{1}{\alpha_5} H^{[24]} v^{[4]}$$

$$\text{Terminal 3: } u_{[3]} = \frac{1}{\alpha_6} H^{[31]} v^{[1]} = \frac{1}{\alpha_7} H^{[32]} v^{[2]} = \frac{1}{\alpha_8} H^{[34]} v^{[4]}$$

$$\text{Terminal 4: } u_{[4]} = \frac{1}{\alpha_9} H^{[42]} v^{[2]} = \frac{1}{\alpha_{10}} H^{[43]} v^{[3]}$$

That is, the network control apparatus 330 may set a relation between a signal space $u_{[1]}$ for the MS (1) 321 and each beamforming vector, $v^{[2]}$ and $v^{[3]}$, to enable the signals transmitted by the BS (2) 312 and the BS (3) 313 to be aligned in $u_{[1]}$.

Also, the network control apparatus 330 may set a relation between a signal space $u_{[2]}$ for the MS (2) 322 and each beamforming vector, $v^{[1]}$, $v^{[3]}$, and $v^{[4]}$ to enable the signals transmitted by the BS (1) 311, the BS (3) 313, and the BS (4) 314 to be aligned in $u_{[2]}$.

Also, the network control apparatus 330 may set a relation between a signal space $u_{[3]}$ for the MS (3) 323 and each beamforming vector, $v^{[1]}$, $v^{[2]}$, and $v^{[4]}$ to enable the signals transmitted by the BS (1) 311, the BS (2) 312, and the BS (4) 314 to be aligned in $u_{[3]}$.

Also, the network control apparatus 330 may set a relation between a signal space $u_{[4]}$ for the MS (4) 324 and each beamforming vector, $v^{[2]}$ and $v^{[3]}$, to enable the signals transmitted by the BS (2) 312 and the BS (3) 313 to be aligned in $u_{[4]}$.

Here, a variable such as α may indicate that a strength of the signals transmitted by the BS (1) 311, the BS (2) 312, the BS (3) 313, and the BS (4) 314 may change.

When the relation of Equation 10 is set, the network control apparatus 330 may calculate $v^{[1]}$, $v^{[2]}$, $v^{[3]}$, $v^{[4]}$, $u_{[1]}$, $u_{[2]}$, $u_{[3]}$, and $u_{[4]}$ using Equation 10, and generate the beamforming information.

Equation 10 may be represented as a determinant given as below.

$$\begin{bmatrix} \alpha_1 I_N & 0 & 0 & 0 & 0 & -H_{[12]} & 0 & 0 \\ \alpha_2 I_N & 0 & 0 & 0 & 0 & 0 & -H_{[13]} & 0 \\ 0 & \alpha_3 I_N & 0 & 0 & -H_{[21]} & 0 & 0 & 0 \\ 0 & \alpha_4 I_N & 0 & 0 & 0 & 0 & -H_{[23]} & 0 \\ 0 & \alpha_5 I_N & 0 & 0 & 0 & 0 & 0 & -H_{[24]} \\ 0 & 0 & \alpha_6 I_N & 0 & -H_{[31]} & 0 & 0 & 0 \\ 0 & 0 & \alpha_7 I_N & 0 & 0 & -H_{[32]} & 0 & 0 \\ 0 & 0 & \alpha_8 I_N & 0 & 0 & 0 & 0 & -H_{[34]} \\ 0 & 0 & 0 & \alpha_9 I_N & 0 & -H_{[42]} & 0 & 0 \\ 0 & 0 & 0 & \alpha_{10} I_N & 0 & 0 & -H_{[43]} & 0 \end{bmatrix} \begin{bmatrix} u^{[1]} \\ u^{[2]} \\ u^{[3]} \\ u^{[4]} \\ v^{[1]} \\ v^{[2]} \\ v^{[3]} \\ v^{[4]} \end{bmatrix} = \hat{Y}\hat{x} = 0$$

[Equation 11]

The network control apparatus 330 may convert the relation of Equation 10 into the determinant of Equation 11, and thereby may calculate $v^{[1]}$, $v^{[2]}$, $v^{[3]}$, $v^{[4]}$, $u_{[1]}$, $u_{[2]}$, $u_{[3]}$, and $u_{[4]}$.

In this case, the network control apparatus 330 may calculate $v^{[1]}$, $v^{[2]}$, $v^{[3]}$, $v^{[4]}$, $u_{[1]}$, $u_{[2]}$, $u_{[3]}$, and $u_{[4]}$ by applying an algorithm to obtain the solution of the linear equation to Equation 11.

In this case, the network control apparatus 330 may calculate $v^{[1]}$, $v^{[2]}$, $v^{[3]}$, $v^{[4]}$, $u_{[1]}$, $u_{[2]}$, $u_{[3]}$, and $u_{[4]}$ from Equation 11 using Newton's method.

Through the above-described exemplary operations, the network control apparatus 330 may generate the beamforming information and transmit the beamforming information to the BS (1) 311, the BS (2) 312, the BS (3) 313, and the BS (4) 314.

Each of the BS (1) 311, the BS (2) 312, the BS (3) 313, and the BS (4) 314 may receive the beamforming information, and transmit a signal to the MS (1) 321, the MS (2) 322, the MS (3) 323, and the MS (4) 324 based on the beamforming information.

When the signal is received from the BS (1) 311, the BS (2) 312, the BS (3) 313, and the BS (4) 314, each of the MS (1) 321, the MS (2) 322, the MS (3) 323, and the MS (4) 324 may reduce or eliminate the interferences aligned in the signal space set by each of the MS (1) 321, the MS (2) 322, the MS (3) 323, and the MS (4) 324.

A method of performing an interference alignment when a number of antennas of a BS in a communication system is limited is described below.

Compared to an exemplary embodiment that partially performs the interference alignment with respect to only a particular interference link from among interference links between a BS and an MS, another exemplary embodiment relates to a method of performing the interference alignment to enable a sum of power of interferences occurring in all interference links to be minimized.

For illustration purposes, assumptions for the another exemplary embodiment may be similar to the assumptions for the exemplary embodiment that partially performs the interference alignment with respect to only a particular interference link from among interference links between a BS and an MS.

Referring again to FIG. 3, each of the BS (1) 311, the BS (2) 312, the BS (3) 313, and the BS (4) 314 may transmit a pilot signal to each of the MS (1) 321, the MS (2) 322, the MS (3) 323, and the MS (4) 324.

In this case, each of the MS (1) 321, the MS (2) 322, the MS (3) 323, and the MS (4) 324 may measure a received SNR and INR based on the pilot signal.

Subsequently, the MS (1) 321, the MS (2) 322, the MS (3) 323, and the MS (4) 324 may determine an effective interference, and feedback channel information of an interference link, determined as the effective interference, to the BS (1) 311, the BS (2) 312, the BS (3) 313, and the BS (4) 314.

For exemplary purposes, it may be assumed that the MS (1) 321, the MS (2) 322, the MS (3) 323, and the MS (4) 324 may feed back channel information of all the interference links to the BS (1) 311, the BS (2) 312, the BS (3) 313, and the BS (4) 314.

When the channel information is received, the BS (1) 311, the BS (2) 312, the BS (3) 313, and the BS (4) 314 may transmit the channel information to the network control apparatus 330.

In this case, the network control apparatus 330 may generate beamforming information for the interference alignment based on the channel information.

As described above, the network control apparatus 330 may be a base station controller which is physically or logically spaced apart from the BS (1) 311, the BS (2) 312, the BS (3) 313, and the BS (4) 314. Also, the network control apparatus 330 may be included in at least one BS of the BS (1) 311, the BS (2) 312, the BS (3) 313, and the BS (4) 314, as a component module.

The network control apparatus 330 may generate the beamforming information for the interference alignment using the relation of Equation 3.

In this case, the relation of Equation 3 may be represented as the determinant of Equation 4.

A total number of antennas of the BS (1) 311, the BS (2) 312, the BS (3) 313, and the BS (4) 314 is to be equal to or greater than 12 so that the network control apparatus 330 may calculate $v^{[1]}$, $v^{[2]}$, $v^{[3]}$, $v^{[4]}$, $u_{[1]}$, $u_{[2]}$, $u_{[3]}$, and $u_{[4]}$ from Equation 4.

However, since the total number of antennas of the BS (1) 311, the BS (2) 312, the BS (3) 313, and the BS (4) 314 is eight, the network control apparatus 330 may not calculate $v^{[1]}$, $v^{[2]}$, $v^{[3]}$, $v^{[4]}$, $u_{[1]}$, $u_{[2]}$, $u_{[3]}$, and $u_{[4]}$ from Equation 4.

That is, although a number of relations of Equation 4 is 24, since a number of unknowns is 16, the network control apparatus 330 may not calculate $v^{[1]}$, $v^{[2]}$, $v^{[3]}$, $v^{[4]}$, $u_{[1]}$, $u_{[2]}$, $u_{[3]}$, and $u_{[4]}$ from Equation 4.

Accordingly, the network control apparatus 330 may calculate a similar solution of Equation 4 using a nonlinear optimization scheme such as 'Newton's method', and use the similar solution as $v^{[1]}, v^{[2]}, v^{[3]}, v^{[4]}, u_{[1]}, u_{[2]}, u_{[3]},$ and $u_{[4]}$.

In this case, the network control apparatus 330 may use a solution, enabling the sum of power of the interferences occurring in all the interference links to be minimum, as $v^{[1]}, v^{[2]}, v^{[3]}, v^{[4]}, u_{[1]}, u_{[2]}, u_{[3]},$ and $u_{[4]}$.

Various exemplary embodiments have been described with reference to FIGS. 1 through 3.

Although the above-described exemplary embodiments have been separately described for convenience of description, the above-described exemplary embodiments may be adaptively used depending on a communication system environment.

For example, in association with exemplary embodiments, a network control apparatus may compare a system capacity, expected when generating beamforming information according to an exemplary embodiment, with a system capacity, expected when generating beamforming information according to another exemplary embodiment, before generating beamforming information for the interference alignment. Accordingly, the network control apparatus may generate the beamforming information according to an optimum method.

Figure 4:
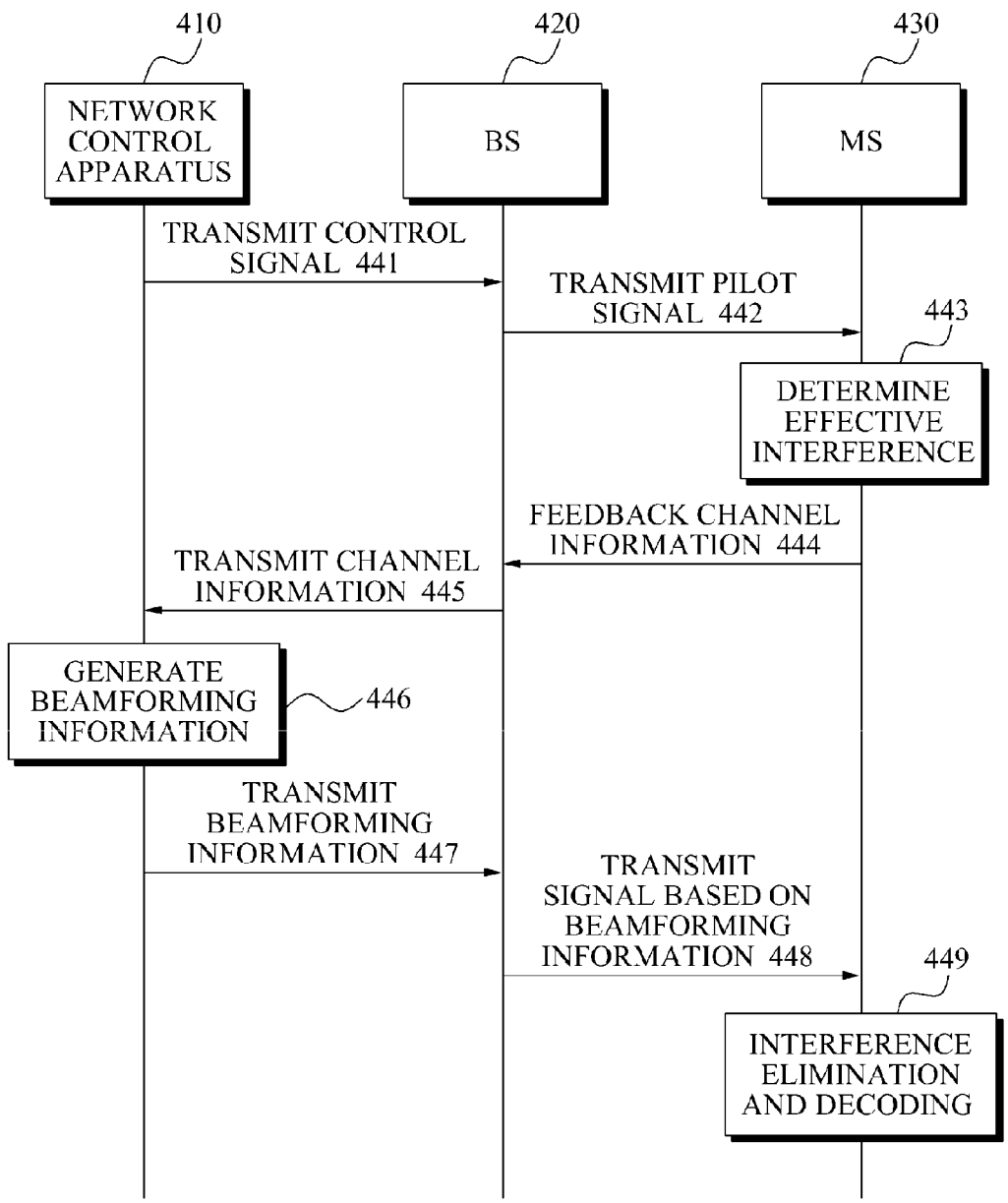
FIG. 4 is a flowchart illustrating an exemplary operation of a communication system.

FIG. 4 is a flowchart illustrating an exemplary operation of a communication system.

The communication system may include a network control apparatus 410, a BS 420, and an MS 430.

In operation 441, the network control apparatus 410 may transmit a control signal, associated with transmission of a pilot signal, to the BS 420.

In operation 442, the BS 420 may transmit the pilot signal to the MS 430 based on the control signal.

In operation 443, the MS 430 may determine an effective interference based on the pilot signal.

In operation 444, the MS 430 may feed back, to the BS 420, channel information of an interference link with a BS transmitting a pilot signal determined as the effective interference.

In operation 445, the BS 420 may transmit the channel information to the network control apparatus 410.

In operation 446, the network control apparatus 410 may generate beamforming information based on a number of antennas of the BS 420 based on the channel information.

In operation 447, the network control apparatus 410 may transmit the beamforming information to the BS 420.

In operation 448, the BS 420 may transmit a signal to the MS 430 based on the beamforming information.

In operation 449, the MS 430 may perform interference prevention, and decode the received signal.

The operations of the network control apparatus 410, the BS 420, and the MS 430 are described with reference to FIG. 4. Since operations of the network control apparatus 410, the BS 420, and the MS 430 have been described with reference to FIG. 1 through FIG. 3, further descriptions are omitted for conciseness.

Figure 5:
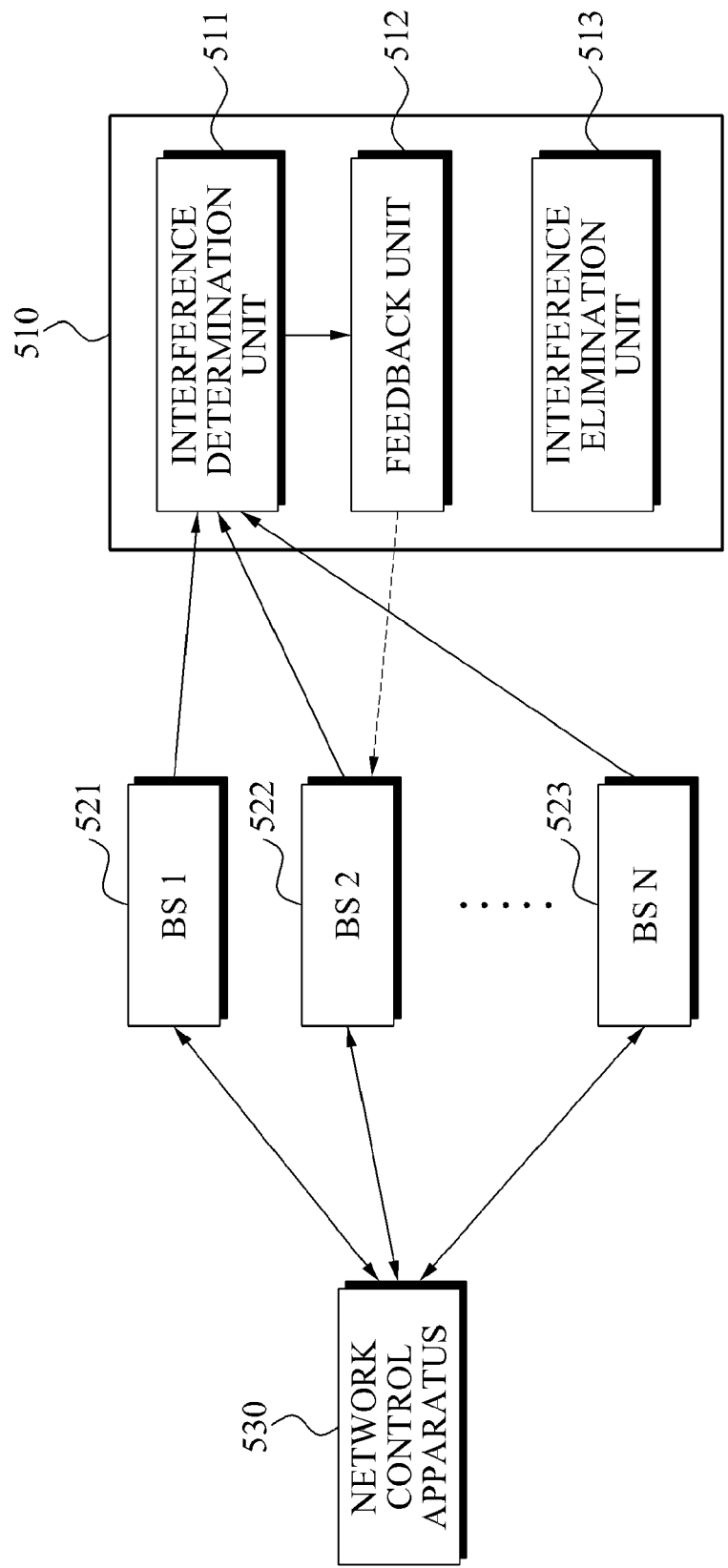
FIG. 5 illustrates a configuration for an exemplary mobile station in a communication system.

FIG. 5 illustrates a configuration for an exemplary mobile station in a communication system.

The communication system includes the mobile station MS 510, and may further include plurality of BSs, that is, a BS (1) 521, a BS (2) 522, and a BS (3) 523, and a network control apparatus 530.

The MS 510 may include an interference determination unit 511 and a feedback unit 512.

The interference determination unit 511 may receive a pilot signal from the plurality of BSs 521, 522, and 523, and determine an effective interference based on the pilot signal.

The feedback unit 512 may feed back channel information of a channel to a service base station. In this instance, the channel may be between the MS 510 and at least one BS transmitting a pilot signal, determined as the effective interference, from among the plurality of BSs 521, 522, and 523.

When a service base station of the MS 510 is the BS (2) 522, the feedback unit 512 may feed back the channel information to the BS (2) 522.

In this case, the plurality of BSs 521, 522, and 523 may receive the channel information from a plurality of MSs including the MS 510, and transmit the channel information to the network control apparatus 530.

The network control apparatus 530 may be a base station controller which is physically or logically spaced apart from the plurality of BSs 521, 522, and 523. Also, the network control apparatus 530 may be included in at least one BS of the plurality of BSs 521, 522, and 523, as a component module.

The network control apparatus 530 may generate beamforming information, associated with an interference alignment, based on a number of effective interferences with respect to the plurality of MSs, and transmit the beamforming information to the plurality of BSs 521, 522, and 523.

The network control apparatus 530 may set a unique signal space for each of the plurality of MSs, and generate the beamforming information to enable the effective interferences of each of the plurality of MSs to be aligned in the signal space set for each of the plurality of MSs.

In this case, the plurality of BSs 521, 522, and 523 may receive the beamforming information from the network control apparatus 530, and transmit a signal to the plurality of MSs based on the beamforming information.

Also, the MS 510 may further include an interference elimination unit 513.

When the MS 510 receives the signal from the plurality of BSs 521, 522, and 523, the interference elimination unit 513 may identify interferences aligned in the signal space set by the network control apparatus 530, and perform an interference prevention.

Also, when a number of antennas of the plurality of BSs 521, 522, and 523 is greater than a number of antennas used to generate the beamforming information, the plurality of BSs 521, 522, and 523 may provide a service to another MS excluding the plurality of MSs using an antenna excluding the antennas, used to generate the beamforming information, from among the antennas of the plurality of BSs 521, 522, and 523.

In this case, the network control apparatus 530 may generate the beamforming information to enable an interference of each of the plurality of MSs to be aligned in the signal space. Here, the interference of each of the plurality of MSs may occur when the plurality of BSs 521, 522, and 523 provides the service to the other MS.

Also, when a number of antennas of the plurality of BSs 521, 522, and 523 is less than the number of antennas used to generate the beamforming information, the network control apparatus 530 may select at least one interference from the effective interferences of the plurality of MSs in an order of interference having a smallest magnitude based on the number of antennas of the plurality of BSs 521, 522, and 523. Also, the network control apparatus 530 may generate the beamforming information regardless of whether the at least one selected interference is aligned in the signal space.

Also, when the number of antennas of the plurality of BSs 521, 522, and 523 is less than the number of antennas used to generate the beamforming information, the network control apparatus 530 may generate the beamforming information to enable a sum of power of the effective interferences of the plurality of MSs to be minimum.

The configuration of the MS 510 has been described with reference to FIG. 5. Since operations of the MS 510, the plurality of BSs 521, 522, and 523, and the network control apparatus 530 have been described with reference to FIG. 1 through FIG. 4, further descriptions are omitted herein for conciseness.

Figure 6:
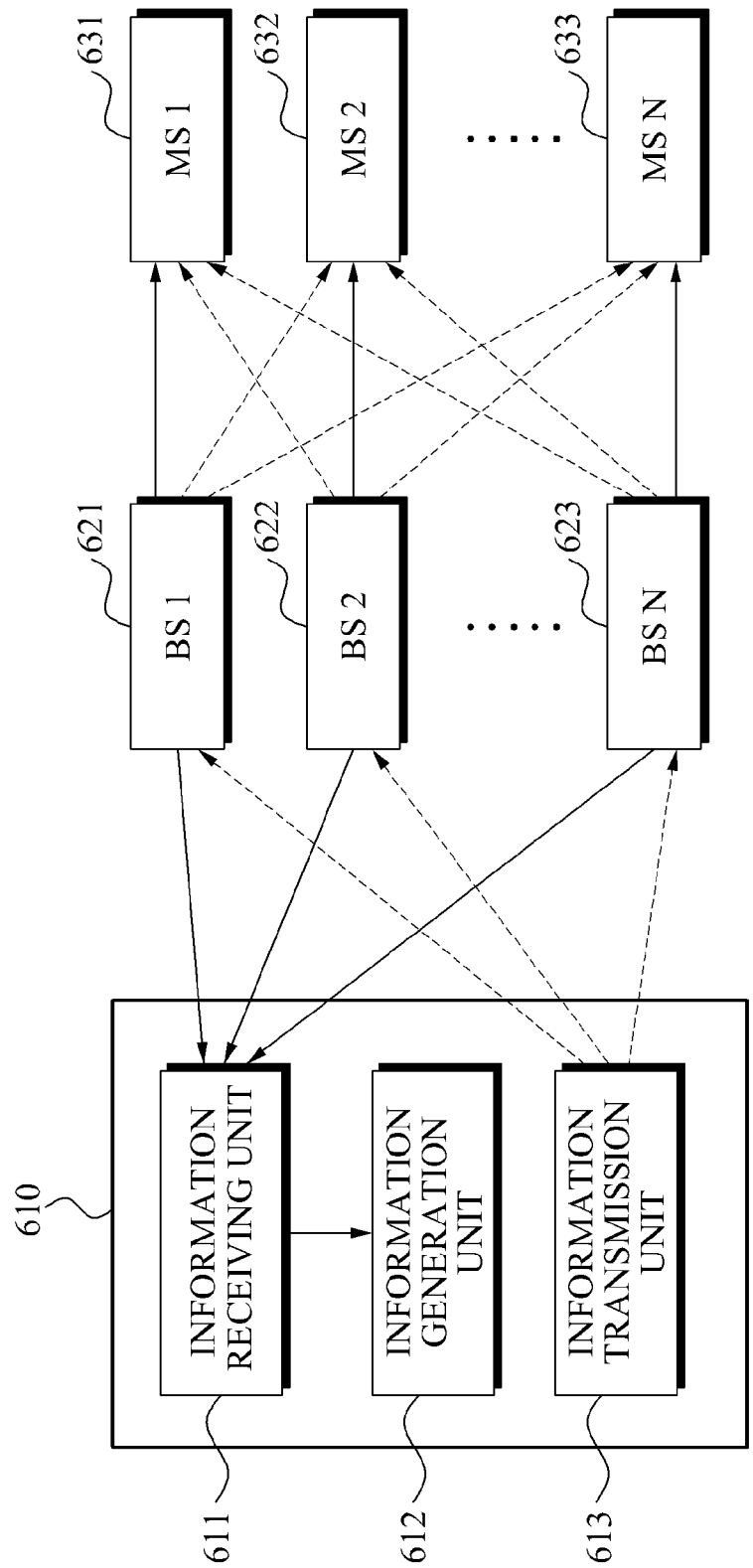
FIG. 6 illustrates a configuration for an exemplary network control apparatus in a communication system.

FIG. 6 illustrates a configuration for an exemplary network control apparatus in a communication system.

The communication system includes the network control apparatus 610, and may further include a plurality of BSs, that is, a BS (1) 621, a BS (2) 622, and a BS (3) 623, and a plurality of MSs, that is, an MS (1) 631, an MS (2) 632, and an MS (3) 633.

The network control apparatus 610 may include an information receiving unit 611, an information generation unit 612, and an information transmission unit 613.

In this case, the network control apparatus 610 may be a base station controller which is physically or logically spaced apart from the plurality of BSs 621, 622, and 623. Also, the network control apparatus 610 may be included in at least one BS of the plurality of BSs 621, 622, and 623, as a component module.

The information receiving unit 611 may receive channel information of the plurality of MSs 631, 632, and 633 from the plurality of BSs 621, 622, and 623.

The information generation unit 612 may generate beamforming information, associated with an interference alignment of the plurality of MSs 631, 632, and 633, according to a number of antennas of the plurality of BSs 621, 622, and 623 based on the channel information.

The information transmission unit 613 may transmit the beamforming information to the plurality of BSs 621, 622, and 623.

In this instance, the plurality of BSs 621, 622, and 623 may transmit a signal to the plurality of MSs 631, 632, and 633 based on the beamforming information.

The information generation unit 612 may set a unique signal space for each of the plurality of MSs 631, 632, and 633, and generate the beamforming information to enable an interference of each of the plurality of MSs 631, 632, and 633 to be aligned in the signal space set for each of the plurality of MSs 631, 632, and 633.

Also, the plurality of MSs 631, 632, and 633 may receive a pilot signal from the plurality of BSs 621, 622, and 623, and determine an effective interference based on the pilot signal. The plurality of MSs 631, 632, and 633 may feed back, to a service base station, the channel information of a channel with at least one BS transmitting a pilot signal, determined as the effective interference, from among the plurality of BSs 621, 622, and 623.

In this case, the information generation unit 612 may generate the beamforming information regardless of whether interferences, different from the effective interference, from among interferences of each of the plurality of MSs 631, 632, and 633 are aligned in the signal space.

Also, when a number of antennas of the plurality of BSs 621, 622, and 623 is greater than a number of antennas used to generate the beamforming information, the plurality of BSs 621, 622, and 623 may provide a service to another MS excluding the plurality of MSs 631, 632, and 633 using an antenna excluding the antennas, used to generate the beamforming information, from among the antennas of the plurality of BSs 621, 622, and 623.

In this case, the information generation unit 612 may generate the beamforming information to enable the interference of each of the plurality of MSs 631, 632, and 633 to be aligned in the signal space. The interference of each of the plurality of MSs 631, 632, and 633 may occur since the plurality of BSs 621, 622, and 623 provides the service to the other MS.

Also, when the number of antennas of the plurality of BSs 621, 622, and 623 is less than the number of antennas used to generate the beamforming information, the information generation unit 612 may select at least one interference from the interferences of the plurality of MSs 631, 632, and 633 in an order of interference having a smallest magnitude based on the number of antennas of the plurality of BSs 621, 622, and 623, and generates the beamforming information regardless of whether the at least one selected interference is aligned in the signal space.

Also, when the number of antennas of the plurality of BSs 621, 622, and 623 is less than the number of antennas used to generate the beamforming information, the information generation unit 612 may generate the beamforming information to enable a sum of power of the effective interferences of the plurality of MSs 631, 632, and 633 to be minimum.

The configuration of the network control apparatus 610 has been described with reference to FIG. 6. Since operations of the network control apparatus 610, the plurality of BSs 621, 622, and 623, and the plurality of MSs 631, 632, and 633 have been described with reference to FIG. 1 through FIG. 4, further descriptions are omitted for conciseness.

According to example(s) described above, a mobile station and a network control apparatus may enable an interference to be aligned in a unique signal space for each mobile station based on a number of antennas of a base station. Accordingly, interference may be reduced or eliminated.

According to example(s) described above, there is provided an interference control technology that is adaptive to environment changes.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer system connected through a network and computer-readable codes or program instructions may be stored and executed in a decentralized manner.

As a non-limiting illustration only, a mobile station described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices capable of wireless communication or a communication consistent with that disclosed herein.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile station, comprising:
an interference determination unit configured to receive a pilot signal from each of a plurality of base stations, and determine an effective interference based on the pilot signal; and
a feedback unit configured to feed back channel information of a channel to a service base station, the channel being between the mobile station and a base station transmitting the pilot signal determined as the effective interference, from among the plurality of base stations,
wherein the plurality of base stations receives the channel information from a plurality of mobile stations comprising the mobile station, and transmits the received channel information to a network control apparatus,
wherein the network control apparatus generates beamforming information associated with an interference alignment, based on a number of effective interferences received at the plurality of mobile stations, and the channel information, and transmits the beamforming information to the plurality of base stations, and
wherein each of the plurality of base stations transmits a signal to the plurality of mobile stations based on the beamforming information.

2. The mobile station of claim 1, wherein the network control apparatus sets a unique signal space for each of the plurality of mobile stations, and generates the beamforming information to enable the effective interferences received at each of the plurality of mobile stations to be aligned in the unique signal space set for each of the plurality of mobile stations.

3. The mobile station of claim 2, further comprising:
an interference elimination unit configured to identify the effective interferences received at the mobile station and aligned in the unique signal space set for the mobile station by the network control apparatus, and eliminate the identified effective interferences, when the signal is received from each of the plurality of base stations.

4. The mobile station of claim 2, further comprising:
an interference elimination unit configured to identify the effective interferences received at the mobile station and aligned in the unique signal space set for the mobile station by the network control apparatus, and perform an interference prevention, when the signal is received from each of the plurality of base stations.

5. The mobile station of claim 1, wherein the plurality of base stations receives the beamforming information from the network control apparatus.

6. The mobile station of claim 1, wherein, when a number of antennas of the plurality of base stations is greater than the number of the effective interferences received at the plurality of mobile stations that is used to generate the beamforming information, each of the plurality of base stations provides a service to another mobile station excluding the plurality of mobile stations, using an antenna excluding antennas used to transmit the signal to the plurality of mobile stations, from among the antennas of the plurality of base stations.

7. The mobile station of claim 6, wherein the network control apparatus sets a unique signal space for each of the plurality of mobile stations, and generates the beamforming information to enable an interference received at each of the plurality of mobile stations to be aligned in the unique signal space set for each of the plurality of mobile stations the interference received at each of the plurality of mobile stations occurring when each of the plurality of base stations provides the service to the other mobile station.

8. The mobile station of claim 1, wherein, when a number of antennas of the plurality of base stations is less than the number of the effective interferences received at the plurality of mobile stations that is used to generate the beamforming information, the network control apparatus selects at least one interference from the effective interferences received at the plurality of mobile stations in an order of an interference comprising a smallest magnitude based on the number of antennas of the plurality of base stations, and generates the beamforming information excluding the selected at least one interference.

9. The mobile station of claim 1, wherein, when a number of antennas of the plurality of base stations is less than the number of the effective interferences received at the plurality of mobile stations that is used to generate the beamforming information, the network control apparatus generates the beamforming information to enable a sum of power of the effective interferences received at the plurality of mobile stations to be minimum.

10. The mobile station of claim 1, wherein the interference determination unit is further configured to:
determine an interference to noise ratio (INR) of the pilot signal;
compare the INR to a predetermined value; and
determine the pilot signal to be the effective interference when the INR is greater than the predetermined value.

11. A network control apparatus, comprising:
an information receiving unit configured to receive channel information of a plurality of mobile stations from a plurality of base stations;
an information generation unit configured to generate beamforming information associated with an interference alignment, based on a number of effective interferences received at the plurality of mobile stations, and the channel information; and
an information transmission unit configured to transmit the beamforming information to the plurality of base stations,
wherein each of the plurality of base stations transmits a signal to the plurality of mobile stations based on the beamforming information.

12. The network control apparatus of claim 11, wherein the information generation unit is further configured to set a unique signal space for each of the plurality of mobile stations, and generate the beamforming information to enable the effective interferences received at each of the plurality of mobile stations to be aligned in the unique signal space set for each of the plurality of mobile stations.

13. The network control apparatus of claim 12, wherein the information generation unit is further configured to generate the beamforming information regardless of whether interferences different from the effective interferences, from among interferences received at each of the plurality of mobile stations, are aligned in the unique signal space.

14. The network control apparatus of claim 11, wherein each of the plurality of mobile stations receives a pilot signal from each of the plurality of base stations, determines an effective interference based on the pilot signal, and feeds back, to a service base station, the channel information of a channel with a base station transmitting the pilot signal determined as the effective interference, from among the plurality of base stations.

15. The network control apparatus of claim 11, wherein, when a number of antennas of the plurality of base stations is greater than the number of the effective interferences received at the plurality of mobile stations that is used to generate the beamforming information, each of the plurality of base stations provides a service to another mobile station excluding the plurality of mobile stations, using an antenna excluding antennas used to transmit the signal to the plurality of mobile stations, from among the antennas of the plurality of base stations.

16. The network control apparatus of claim 15, wherein the information generation unit is further configured to set a unique signal space for each of the plurality of mobile stations, and generate the beamforming information to enable an interference received at each of the plurality of mobile stations to be aligned in the unique signal space set for each of the plurality of mobile stations, the interference received at each of the plurality of mobile stations occurring when each of the plurality of base stations provides the service to the other mobile station.

17. The network control apparatus of claim 11, wherein, when a number of antennas of the plurality of base stations is less than the number of the effective interferences received at the plurality of mobile stations that is used to generate the beamforming information, the information generation unit is further configured to select at least one interference from the effective interferences received at the plurality of mobile stations in an order of a least interference based on the number of antennas of the plurality of base stations, and generate the beamforming information excluding the selected at least one interference.

18. The network control apparatus of claim 11, wherein, when a number of antennas of the plurality of base stations is less than the number of the effective interferences received at the plurality of mobile stations that is used to generate the beamforming information, the information generation unit is further configured to generate the beamforming information to enable a sum of power of the effective interferences received at the plurality of mobile stations to be minimum.

19. The network control apparatus of claim 11, wherein the beamforming information comprises a beamforming vector of each of the effective interferences received at the plurality of mobile stations.

20. The network control apparatus of claim 19, wherein the information generation unit is further configured to set a unique vector space for each of the plurality of mobile stations, and generate the beamforming vector of each of the effective interferences received at the plurality of mobile stations based on the respective unique vector space and the respective channel information.

* * * * *